(12) United States Patent
Capio

(10) Patent No.: US 7,644,532 B2
(45) Date of Patent: Jan. 12, 2010

(54) METHODS AND APPARATUS FOR NETTING FISH

(76) Inventor: Christopher James Capio, 734 Windingpath La., Manchester, MO (US) 63021

( * ) Notice: Subject to any disclaimer, the term of this patent is extended or adjusted under 35 U.S.C. 154(b) by 0 days.

(21) Appl. No.: 11/600,466

(22) Filed: Nov. 16, 2006

(65) Prior Publication Data
US 2008/0115400 A1    May 22, 2008

(51) Int. Cl.
*A01K 77/00*    (2006.01)
(52) U.S. Cl. .............................. 43/11; 43/7; 43/12; 43/4
(58) Field of Classification Search .................... 43/11, 43/12, 7, 4, 133, 134; 294/118, 16, 99.2, 294/1.4
See application file for complete search history.

(56) References Cited

U.S. PATENT DOCUMENTS

| | | | | | |
|---|---|---|---|---|---|
| 97,399 | A | * | 11/1869 | Holmes | 294/118 |
| 138,541 | A | * | 5/1873 | Stiles | 43/11 |
| 160,606 | A | * | 3/1875 | Marsh | 43/134 |
| 609,160 | A | * | 8/1898 | McWithey | 43/134 |
| 818,465 | A | * | 4/1906 | Price | 294/118 |
| 856,681 | A | * | 6/1907 | Cederstrom | 294/118 |
| 959,555 | A | * | 5/1910 | Koberstein | 43/12 |
| 1,099,342 | A | * | 6/1914 | Copenhaver | 43/137 |
| 1,168,919 | A | * | 1/1916 | Surface | 294/118 |
| 1,462,758 | A | * | 7/1923 | Henderson | 294/118 |
| 1,488,725 | A | * | 4/1924 | Zilocki | 294/118 |
| 1,514,863 | A | * | 11/1924 | Rytell | 294/118 |
| 1,588,927 | A | * | 6/1926 | Willis | 294/118 |
| 1,608,498 | A | * | 11/1926 | Fisher | 294/118 |
| 1,763,437 | A | * | 6/1930 | Munkelwitz | 294/118 |
| 1,949,452 | A | * | 3/1934 | Chadwick | 43/4 |
| 2,263,965 | A | * | 11/1941 | Fiori | 294/99.2 |
| 2,382,319 | A | * | 8/1945 | Kramer | 43/7 |
| 2,457,922 | A | * | 1/1949 | Robinson | 43/12 |
| 2,480,924 | A | * | 9/1949 | Heger | 43/11 |
| 2,485,781 | A | * | 10/1949 | Schreiber et al. | 43/12 |
| 2,578,344 | A | * | 12/1951 | Everett | 294/118 |
| 2,611,982 | A | * | 9/1952 | Sears | 43/11 |
| D168,879 | S | * | 2/1953 | Becker | 43/4 |
| 2,634,159 | A | * | 4/1953 | Agneberg | 43/4 |
| 2,644,455 | A | * | 7/1953 | Benoit | 294/118 |

(Continued)

FOREIGN PATENT DOCUMENTS

DE    3718283 A1 * 10/1987

(Continued)

*Primary Examiner*—Darren W Ark
(74) *Attorney, Agent, or Firm*—Armstrong Teasdale LLP

(57) ABSTRACT

A fish net and a method of netting a fish are provided. The fish net includes a pair of elongate members. A first of the elongate members includes a handle portion, a net assembly, and a body extending therebetween. The net assembly includes a frame including a mating surface, and a net coupled to the frame. A second of the elongate members includes a handle portion, a net assembly, and a body extending therebetween. The net assembly includes a frame including a mating surface, and a net coupled to the frame. The first and second elongate members are pivotally coupled together such that the net assemblies are moveable from a closed position wherein a first of the net assemblies is positioned in contact against the second of the net assemblies, to an open position wherein the two net assemblies are positioned a distance apart.

14 Claims, 2 Drawing Sheets

U.S. PATENT DOCUMENTS

| | | | | |
|---|---|---|---|---|
| 2,653,048 A * | 9/1953 | Novak | | 43/4 |
| 2,683,321 A * | 7/1954 | Faber | | 43/12 |
| 2,724,920 A * | 11/1955 | Boehm | | 43/12 |
| 2,771,701 A * | 11/1956 | Harper et al. | | 43/7 |
| 2,874,506 A * | 2/1959 | Cliff | | 43/11 |
| 2,887,948 A * | 5/1959 | Kramer et al. | | 294/118 |
| 2,950,939 A * | 8/1960 | Van Volkenburgh | | 294/16 |
| 3,153,554 A * | 10/1964 | Beihl | | 294/118 |
| 3,167,878 A * | 2/1965 | Daffraou | | 43/12 |
| 3,201,888 A * | 8/1965 | Barbee | | 43/4 |
| 3,318,035 A * | 5/1967 | Hovland | | 43/12 |
| 3,664,703 A * | 5/1972 | Talley | | 294/118 |
| 3,747,250 A * | 7/1973 | Willinger | | 43/11 |
| 3,778,097 A * | 12/1973 | Dorzan | | 294/1.4 |
| 3,803,743 A * | 4/1974 | Nalepka | | 43/11 |
| 3,921,327 A * | 11/1975 | Casazza | | 43/4 |
| 3,964,775 A * | 6/1976 | Boyd | | 294/16 |
| D240,838 S * | 8/1976 | Nitu | | 294/1.3 |
| 4,021,956 A * | 5/1977 | Hogg | | 43/12 |
| 4,063,380 A * | 12/1977 | Grim | | 43/11 |
| 4,169,331 A * | 10/1979 | Baker | | 43/11 |
| 4,174,586 A * | 11/1979 | Burzdak | | 43/134 |
| 4,215,887 A * | 8/1980 | Boots | | 294/1.4 |
| 4,251,938 A * | 2/1981 | Goldman et al. | | 43/11 |
| 4,272,906 A * | 6/1981 | Liebling | | 43/11 |
| D269,796 S * | 7/1983 | Stringfellow | | D22/124 |
| D273,409 S * | 4/1984 | Willinger | | 43/12 |
| 4,574,513 A * | 3/1986 | Wearing | | 43/12 |
| 4,577,900 A * | 3/1986 | Chasen | | 294/118 |
| 4,600,007 A * | 7/1986 | Lahodny et al. | | 606/174 |
| 4,620,386 A * | 11/1986 | Hare | | 43/4 |
| 4,666,451 A * | 5/1987 | Samaria | | 294/25 |
| D292,035 S * | 9/1987 | Aksamit | | 294/1.3 |
| 4,742,617 A * | 5/1988 | Gauvry | | 30/232 |
| 4,904,009 A * | 2/1990 | Kozlinski | | 294/118 |
| 4,932,150 A * | 6/1990 | Sher | | 43/11 |
| 5,027,549 A * | 7/1991 | Person | | 43/134 |
| 5,046,381 A * | 9/1991 | Mueller | | 294/25 |
| 5,054,226 A * | 10/1991 | Hart | | 43/4 |
| 5,114,199 A * | 5/1992 | Newcomer | | 294/118 |
| 5,133,737 A * | 7/1992 | Grismer | | 606/205 |
| 5,186,506 A * | 2/1993 | Gale | | 294/118 |
| 5,276,995 A * | 1/1994 | Johnson | | 43/11 |
| D349,940 S * | 8/1994 | Blaisdell | | D22/124 |
| 5,335,591 A * | 8/1994 | Pozar | | 294/118 |
| 5,342,513 A * | 8/1994 | Wall et al. | | 43/11 |
| 5,564,146 A * | 10/1996 | Luu | | 294/99.2 |
| 5,601,322 A * | 2/1997 | Forest | | 294/118 |
| 5,605,003 A * | 2/1997 | Krc et al. | | 43/12 |
| 5,727,828 A * | 3/1998 | Jones | | 294/118 |
| 5,794,377 A * | 8/1998 | Kensok et al. | | 43/134 |
| 5,795,002 A * | 8/1998 | Boron | | 294/99.2 |
| 5,822,908 A * | 10/1998 | Blanchard | | 43/11 |
| 5,843,100 A * | 12/1998 | Meade | | 606/147 |
| 5,893,596 A * | 4/1999 | Martin et al. | | 294/118 |
| 5,901,993 A * | 5/1999 | Lowery et al. | | 294/118 |
| 6,058,642 A * | 5/2000 | Branneman | | 43/12 |
| 6,062,168 A * | 5/2000 | Host et al. | | 294/1.4 |
| 6,068,311 A * | 5/2000 | Jones | | 294/1.4 |
| 6,205,699 B1 * | 3/2001 | Bogni | | 43/53.5 |
| 6,260,897 B1 * | 7/2001 | Carano | | 294/118 |
| 6,272,709 B1 * | 8/2001 | Strini | | 43/4 |
| 6,412,213 B1 * | 7/2002 | Wellard | | 43/12 |
| 6,598,335 B2 * | 7/2003 | Akhtar et al. | | 43/12 |
| 6,615,533 B2 * | 9/2003 | Wellard | | 43/12 |
| 6,827,378 B1 * | 12/2004 | Wong | | 294/1.4 |
| 6,968,644 B1 * | 11/2005 | Garcia | | 43/4 |
| 7,036,263 B2 * | 5/2006 | Yang et al. | | 43/11 |
| 7,090,269 B2 * | 8/2006 | Kelsey | | 294/118 |
| 2001/0015561 A1 * | 8/2001 | Tseng | | 294/16 |
| 2004/0068914 A1 * | 4/2004 | Wellard et al. | | 43/12 |
| 2008/0271360 A1 * | 11/2008 | Barfield | | 43/4 |

FOREIGN PATENT DOCUMENTS

| | | | |
|---|---|---|---|
| DE | 29712704 U1 * | 11/1997 | |
| DE | 29819734 U1 * | 7/1999 | |
| DE | 20108811 U1 * | 9/2001 | |
| DE | 20214815 U1 * | 11/2002 | |
| DE | 10125755 A1 * | 12/2002 | |
| DE | 2006019766 U1 * | 5/2007 | |
| GB | 2248166 A * | 4/1992 | |
| JP | 08056532 A * | 3/1996 | |
| JP | 08238044 A * | 9/1996 | |
| JP | 11103718 A * | 4/1999 | |
| JP | 200473022 A * | 3/2004 | |
| JP | 2004222696 A * | 8/2004 | |
| JP | 2006149357 A * | 6/2006 | |
| JP | 2007175001 A * | 7/2007 | |

* cited by examiner

METHODS AND APPARATUS FOR NETTING FISH

BACKGROUND OF THE INVENTION

This invention relates generally to aquarium tools, and more particularly, to methods and apparatus for netting fish.

The use of aquarium fish nets is well known. In particular, as the popularity of fish tanks has increased, the cost of fish for inclusion in aquariums as also increased. To maintain the health of such fish, as well as the aesthetic value of their aquariums, aquariums are routinely cleaned. To reduce the risk of illness or infection to the fish in the aquarium being cleaned, at least some fish are transferred to another location while the aquarium is cleaned. Generally is not desirable for users to touch the fish with their hands when the fish are transferred, such as when the tanks are cleaned.

Accordingly, at least some known fish nets include a scoop net coupled to a handle that enables the user to remain a distance from touching the fish. For example, U.S. Pat. No. 4,251,938 to Goldman et al. describes an aquarium fish net that includes a scoop net suspended from a handle. Generally, a user holds the handle of the fishnet and inserts the scoop net into the aquarium water in an attempt to scoop a fish from the water into the scoop net through an open end of the net. However, depending on the size, speed, and/or activity level of the fish, capturing a fish in such a net may be a time-consuming and/or difficult task.

With at least some known fish nets, depending on the size, strength, and/or activity level of the fish, for example, a risk exists that a fish may leap, wriggle, or otherwise escape from the net as it is being transferred from one aquarium to another. To reduce the risk of fish undesirably escaping from the fish net while the fish is being relocated, other known fish nets include mechanisms which allow the user to selectively "close off" the open end of the fish net. For example, U.S. Pat. No. 5,822,908 to Blanchard describes a fish netting device that includes a net closure member that is slidably positionable across the open end of the scoop net as the user slides a mechanism forward through the handle. Similarly, U.S. Pat. No. 4,272,906 to Liebling describes a fish net including a cover that is slidably positionable across an open end of the fish net as the user slides an actuator rod through the handle. However, depending on the size and activity of the fish captured within such nets, it may be difficult for a user to close the net with the same hand that is holding the handle. Moreover, because of the position of the fish nets relative to the handle connected to the nets, it may be a time-consuming and/or difficult task to capture a fish depending on the size, speed, and/or activity level of the fish.

In contrast to the above-referenced fish nets, U.S. Pat. No. 5,601,322 to Forest describes an aquarium tool that includes a double net that is coupled to a pair of tong handles in a purse-like configuration. The tongs are moveable to open and close only the open end of the double net while the net remains coupled to, and suspended from, each of the tongs. However, because of the orientation of the net relative to the tong handles, capturing an active fish in the double net may be difficult.

BRIEF DESCRIPTION OF THE INVENTION

In one aspect, a fish net is provided that overcomes the problems associated with those of the prior art and includes a pair of elongate members. A first of the elongate members includes a handle portion, a net assembly, and a body extending therebetween. The first net assembly includes a frame including a mating surface, and a net coupled to the frame. A second of the elongate members includes a handle portion, a net assembly, and a body extending therebetween. The second net assembly includes a frame including a mating surface, and a net coupled to the frame. The elongate members are pivotally coupled together such that the first and second member net assemblies are moveable from a closed position wherein the first net assembly is positioned in contact against the second net assembly, to an open position wherein the first net assembly is positioned a distance away from the second net assembly.

In another aspect, a method for netting a fish from an aquarium is provided. The method includes providing a fish net including a pair of elongate members that are pivotally coupled together and that each include a first end, a second end, and a body extending therebetween, wherein each of the first ends includes a net assembly and each of the second ends includes a handle portion, and inserting the fish net into the aquarium such that the net assemblies are positioned in an open position wherein a first of the net assemblies is positioned a distance away from the second of the net assemblies. The method also includes maneuvering the fish net such that a fish to be netted is positioned between the net assemblies, and closing the fish net such that the net assemblies are brought into contact with each other and such that the fish is netted within the net assemblies and is prevented from escaping the fish net until the net assemblies are moved to the open position.

In a further aspect, an aquarium tool including a pair of elongate members each including a first end, a second end, and a body extending therebetween. Each of the first ends includes a net assembly, and each of the second ends includes a handle portion. The elongate members are pivotally coupled together with a fastener mechanism that extends through the bodies of the elongate members such that the net assemblies are moveable from a closed position, wherein at least a portion of the net assemblies are in contact, to an open position wherein the net assemblies are positioned a distance apart.

DETAILED DESCRIPTION OF THE INVENTION

Figure 1:
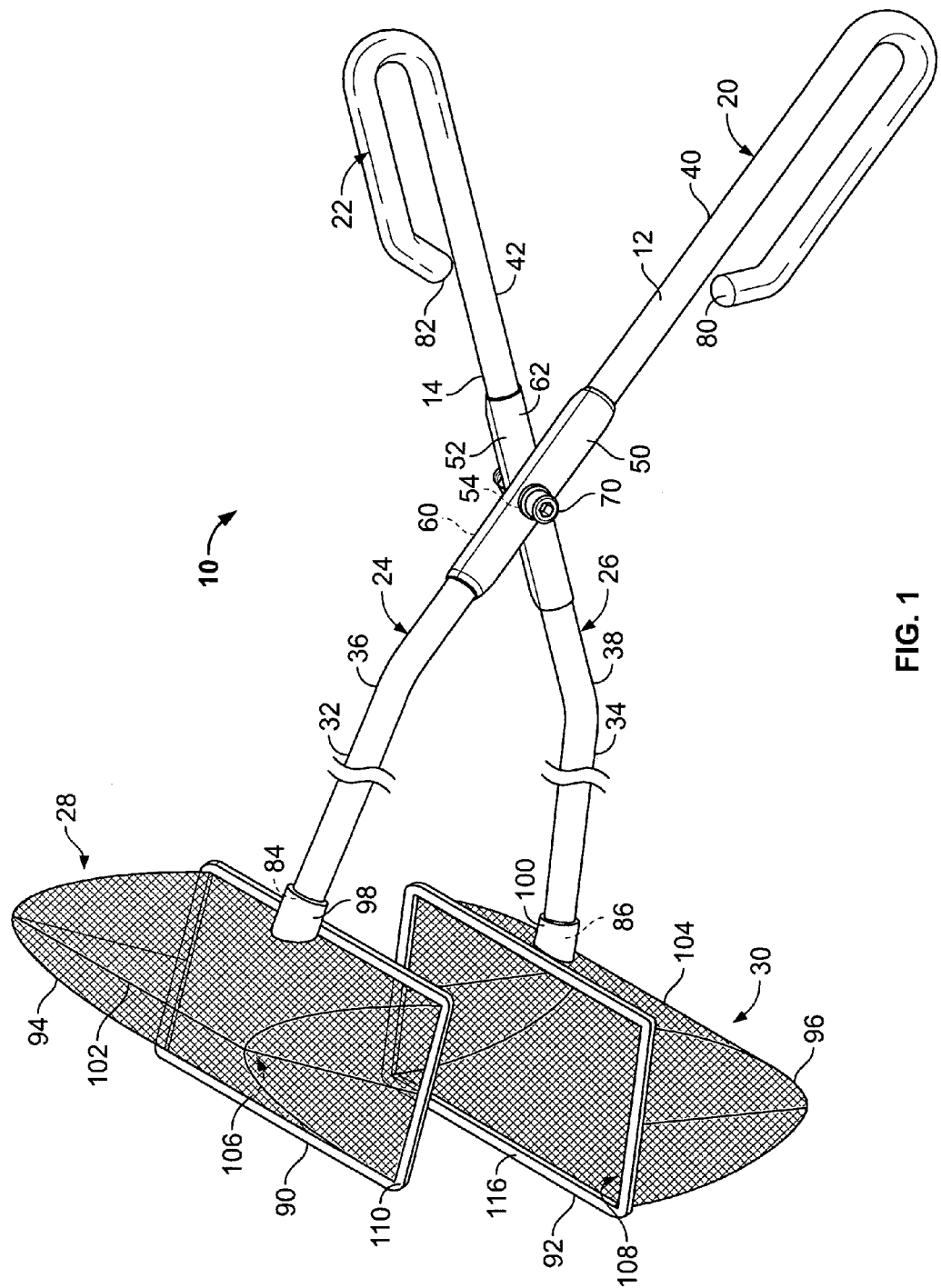
FIG. 1 is a perspective view of an exemplary fish net.
Figure 2:
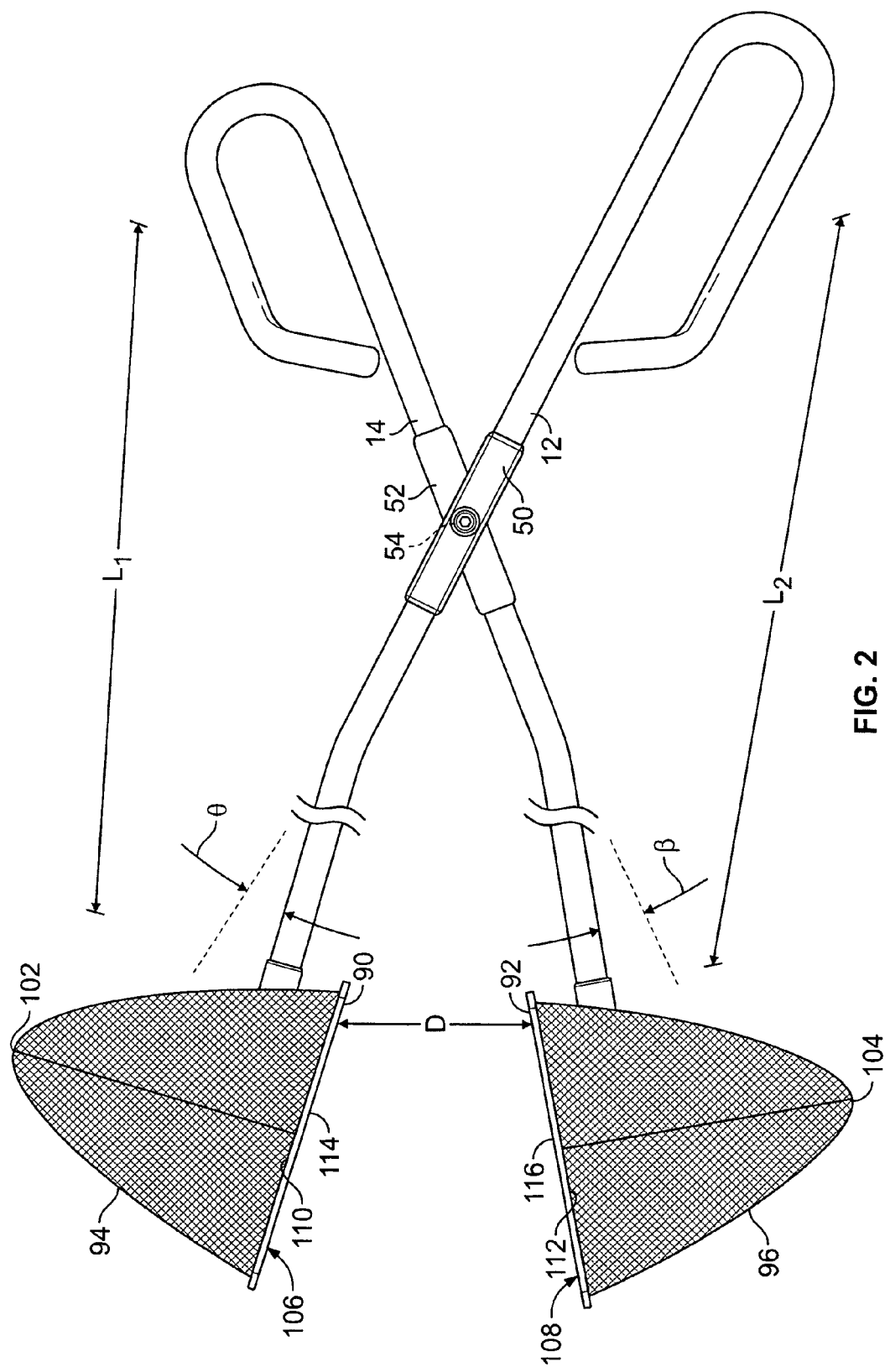
FIG. 2 is a side view of the exemplary fish net shown in FIG. 1.

FIG. 1 is a perspective view of an exemplary fish net 10. FIG. 2 is a side view of fish net 10. In the exemplary embodiment, fish net 10 is used to capture or net fish within an aquarium. In alternative embodiments, fish net 10 is used to capture fish swimming in water other than in aquariums. As used herein, the term "fish net," refers to devices that enable a user to capture aquatic life using a single hand. As such, the methods and apparatus described herein are not limited to being only with aquariums. Moreover, as will be appreciated by one of ordinary skill in the art, the methods and apparatus described herein are not limited to being used with only fish, but rather the present invention may be used with other items including, but not limited to, sea life, aquatic life, or specimens from water. As such, the following description is merely exemplary in nature and is in no way intended to limit the invention, its application, or uses.

In the exemplary embodiment, fish net 10 includes a pair of elongate members 12 and 14. In the exemplary embodiment, members 12 and 14 are substantially identical and each includes a respective handle portion 20 and 22, a body 24 and 26, and a net assembly 28 and 30. Each body 24 and 26 extends between each respective handle portion 20 and 22, and each respective net assembly 28 and 30. In the exemplary embodiment, each body 24 and 26 includes a first section 32 and 34 that extends from each respective net assembly 28 and 30 to an elbow 36 and 38, and a second section 40 and 42 that extends from each respective elbow 36 and 38 to each respective handle portion 20 and 22. More specifically, in the exemplary embodiment, each body first section 32 and 34 is offset radially inward from each respective body second section 40 and 42 by a respective angle $\theta$ and $\beta$. In the exemplary embodiment, angles $\theta$ and $\beta$ are approximately equal. Alternatively, angles $\theta$ and $\beta$ may each be selected to be any angle that enables fish net 10 to function as described herein.

Each elongate member 12 and 14 has a respective length $L_1$ and $L_2$ that is measured from each net assembly 28 and 30 to each respective handle portion 20 and 22. In the exemplary embodiment, each elongate member 12 and 14 includes a respective coupling portion 50 and 52 that are each formed with an opening 54 extending therethrough. To facilitate pivotally coupling member 12 to member 14, in the exemplary embodiment, coupling portions 50 and 52 are each formed with a substantially planar inner surface 60 and 62. Moreover, in the exemplary embodiment, with the exception of coupling portions 50 and 52, each elongate member 12 and 14 has a substantially circular cross-sectional profile along each length $L_1$ and $L_2$.

Openings 54 are sized to receive a fastener mechanism 70 therethrough. Fastener mechanism 70 pivotally couples member 12 to member 14 in a tong-like orientation. Alternatively, any other coupling mechanism that enables fish net 10 to function as described herein, may be used to couple member 12 to member 14, such as, but not limited to, a ball detent coupling and/or a ball and socket coupling.

In the exemplary embodiment, each handle portion 20 and 22 is formed integrally with each respective elongate member body 24 and 26. More specifically, in the exemplary embodiment, a free end 80 and 82 of each elongate member 12 and 14, respectively, is bent in an elliptical loop to form each respective handle portion 20 and 22. In the exemplary embodiment, handle portion 20 is larger than handle portion 22. Alternatively, handle portions 20 and 22 may be any size, including being identically sized, that enables fish net 10 to function as described herein. In another alternative embodiment, at least one of handle portion 20 and/or 22 is coupled to a respective body 24 and/or 26 using any known fastening method, including but not limited to, a welding process. In a further alternative embodiment, at least one of handle portion 20 and/or 22 is removably coupled to a respective body 24 and/or 26 using any known fastening method that enables that handle portion 20 and/or 22 to be removably coupled to a respective body 24 and/or 26, such as through a threaded coupling arrangement.

Net assemblies 28 and 30 each extend from an end 84 and 86 of bodies 24 and 26 that is opposite ends 80 and 82. In the exemplary embodiment, net assemblies 28 and 30 are each coupled to a respective member body 24 and/or 26 using any known fastening method, including but not limited to, a welding process. In a further alternative embodiment, at least one of the net assemblies 28 and/or 30 is removably coupled to a respective body 24 and/or 26 using any known fastening method that enables that net assembly 28 and/or 30 to be removably coupled to a respective body 24 and/or 26, such as through a threaded coupling arrangement.

In the exemplary embodiment, net assemblies 28 and 30 are substantially identical. Alternatively, net assemblies 28 and 30 are different, such as but not limited to being sized differently, shaped differently, and/or fabricated from different materials. In the exemplary embodiment, each respective net assembly 28 and 30 includes a frame 90 and 92, a net 94 and 96, and a coupling mechanism 98 and 100. Specifically, in the exemplary embodiment, each net 94 and 96 extends from, and is only suspended from, each respective frame 90 and 92. More specifically, in the exemplary embodiment, each net 94 and 96 has a substantially U-shaped cross-sectional shape and each extends from each respective frame 90 and 92 in a pocket-like configuration. As such, each net 94 and 96 has a respective defined bottom 102 and 104, and a defined opening 106 and 108. Alternatively, net 94 and/or net 96 may have any shape that enables fish net 10 to function as described herein. For example, in one embodiment, net 94 has a substantially U-shaped cross-sectional shape, and net 96 is merely stretched tautly across frame 92.

Each opening 106 and 108 is bordered by, and is defined by, each respective frame 90 and 92. Accordingly, in the exemplary embodiment, each frame 90 and 92 is substantially planar and each has a substantially rectangular shape. As such, in the exemplary embodiment, each net opening 106 and 108 has a substantially rectangular shape. Alternatively, frames 90 and 92 may be of any shape that enables fish net 10 to function as described herein.

Each frame 90 and 92 includes a radially outer surface 110 and 112, respectively, and a radially inner or mating surface 114 and 116, respectively. In the exemplary embodiment, frames 90 and 92 are identical and as such, are each shaped, oriented, and sized identically. Alternatively, frames 90 and 92 may be of any shape, orientation, and/or size that enables fish net 10 to function as described herein. More specifically, in the exemplary embodiment, frames 90 and 92 are oriented with respect to each other, such that when members 12 and 14 are rotated to a closed position, described in more detail below, the mating surfaces 114 and 116 of each frame 90 and 92 are positioned substantially flush against each other. For example, in one embodiment, frame 90 is formed with a convex profile and frame 92 is formed with a mating concave profile.

In the exemplary embodiment, members 12 and 14 are pivotally coupled together via fastener mechanism 70. Specifically, members 12 and 14 are each moveable with respect to each other from a closed position to an open position. Specifically, in the closed position, net assembly 28 is positioned in contact against at least a portion of net assembly 30. More specifically, when members 12 and 14 are rotated to the closed position, the mating surface 114 of frame 90 is positioned substantially flush against the mating surface 116 of frame 92. Moreover, in the exemplary embodiment, because frames 90 and 92 are identical, and because of the orientation of frames 90 and 92, when members 12 and 14 are rotated to the closed position, frames 90 and 92 are substantially concentrically aligned and each net opening 106 and 108 is bordered by the mating contact between frames 90 and 92. In an alternative embodiment, when members 90 and 92 are rotated to the closed position, because frames 90 and 92 have different shapes, orientations, or sizes, only a portion of mating surfaces 114 and 116 are positioned in mating contact.

In the exemplary embodiment, when members 12 and 14 are rotated from the closed position towards the open position, net assemblies 28 and 30 are moved a distance D apart, as measured between frames 90 and 92. The distance D of separation between net assemblies 28 and 30 is variable depending on the amount of rotation of members 12 and 14.

During use, a user desiring to transfer a fish from one aquarium to another for example, initially inserts at least two of the fingers of one of their hands into fish net handle portion 20 and the thumb of the same hand into fish net handle portion 22. The fish net 10 is then inserted into the aquarium water and members 12 and 14 are rotated to the open position. Alternatively, members 12 and 14 may be rotated to the open position prior to, or substantially simultaneously with, fish net 10 being inserted into the aquarium water. The user then maneuvers the fish net into position such that a desired fish for example, is between the open net assemblies 28 and 30. As members 12 and 14 are rotated to the closed position, the fish is guided into the open end 106 and/or 108 of nets 94 and 96 and is netted within one or both nets 94 and 96. When rotated to the closed position, the mating surface 114 of frame 90 is positioned in mating contact against the mating surface 116 of frame 92, and the fish is netted within fish net 10. Moreover, because the mating contact of surfaces 114 and 116 circumscribes net openings 106 and 108, the fish netted within fish net 10 is prevented from exiting the pocketed-configuration defined by nets 94 and 96 until members 12 and 14 are rotated to the open position. In addition, in the exemplary embodiment, because nets 94 and 96 are each coupled in a pocket-like configuration, the netted volume capability defined by nets 94 and 96 is doubled in comparison to those fish nets which use only one net. As such, fish net 10 enables a user to net a larger fish in comparison to fish nets of the prior art which have only one net. Moreover, the increased volume capability of fish net 10 also facilitates preventing damage to fish being transferred as such fish are no longer crammed into a single net.

The above-described fish net provide a user with a tool that may be used to transfer fish, for example, from one location to another with a single hand and in such a manner that the risks of the netted fish undesireably exiting the net are facilitated to be reduced in comparison to known fish nets. More specifically, the fish net includes a pair of elongated members that each include a net assembly. The frames of each net assembly are configured to contact in a mating relationship when the elongated members are rotated to the closed position. The mating relationship of the frames substantially prevents the netted fish from exiting the fish net until the elongated members are rotated to the open position. As a result, a fish net is provided which facilitates reducing the risk of a netted fish from inadvertently escaping the captivity of the fish net in a cost-effective and reliable manner.

Exemplary embodiments of fish nets are described above in detail. Although the methods and apparatuses described herein for use in transferring fish from one aquarium to another are herein described and illustrated in association with the above-described fish net, it should be understood that the present invention may be used with any other water life animal or item. More specifically, the fish net described herein is not limited to being used with aquariums, marine life, or with the specific embodiments described herein, but rather, aspects of the fish net and/or method of netting a fish may be utilized independently and separately from other fish nets and/or netting methods.

Moreover, based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its exemplary embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a general and descriptive sense on and not for the purpose of limitation.

What is claimed is:

1. An aquarium tool comprising a pair of elongate members each comprising a first end, a second end, and a body extending therebetween, each of said first ends comprising a net assembly comprising a substantially rectangular frame and a net coupled to said frame, each said net assembly is coupled to and suspended from only one of said first ends, such that each said net hangs from said first end with a U-shaped cross-sectional profile such that said net tapers from a first end thereof at said frame to a rounded second end thereof spaced away from said frame, each of said bodies comprising a first section, a second section, and an elbow therebetween, said first section having an axis which is at an angle relative to an axis of said second section at said elbow, each of said second ends comprising a handle portion, said handle portion comprising an elliptical loop having a first end attached to the second section and terminating at a second free end spaced laterally from the second section, said elongate members pivotally coupled together via a fastener mechanism extending through said bodies of said elongate members such that said net assemblies are moveable from a closed position, wherein at least a portion of said net assemblies are in contact, to an open position wherein said net assemblies are a distance apart, and said second sections of said bodies of said pair of elongate members having coupling portions, said elongate members pivotally coupled together at said coupling portions which have substantially planar inner faces that face each other to facilitate the pivotal coupling of the pair of elongate members.

2. An aquarium tool in accordance with claim 1 wherein a first of said elongate members is removably coupled to a second of said elongate members via said fastener mechanism.

3. An aquarium tool in accordance with claim 1 wherein said net assemblies are substantially concentrically aligned when said net assemblies are in said closed position.

4. An aquarium tool in accordance with claim 1 wherein at least one of said net assemblies is removably coupled to one of said elongate members.

5. An aquarium tool in accordance with claim 1 wherein said pair of elongate members are substantially identical.

6. An aquarium tool in accordance with claim 1 wherein a first of said net assemblies is identical to a second of said net assemblies.

7. An aquarium tool in accordance with claim 1 wherein said net is fabricated from a material that is adapted for use in water.

8. An aquarium tool in accordance with claim 1 wherein a portion of a first of said net assemblies is configured to substantially mate against a portion of a second of said net assemblies when said net assemblies are in said closed position.

9. A fish net comprising:
a first elongate member comprising a first handle portion, a first net assembly, and a first body extending therebetween, said first net assembly comprising a first substantially rectangular frame comprising a first mating surface, and a first net coupled to said first frame in a first pocket configuration, said first net defining a first opening into said first pocket configuration, and said first net suspended only from said first frame, such that said first net extends from said first frame with a U-shaped cross-sectional shape such that said first net tapers from a first end of said first net which is at said first frame to a rounded second end of said first net spaced away from said first frame, said first body comprising a first body first section, a first body second section, and a first elbow therebetween, said first body first section having an axis which is at an angle relative to an axis of said first body second section at said first elbow; and a second elongate member comprising a second handle portion, a second net assembly, and a second body extending therebetween, said second net assembly comprising a second substantially rectangular frame comprising a second mating surface, and a second net coupled to said second frame in a second pocket configuration, said second net defining a second opening into said second pocket configuration and said second net suspended only from said second frame, such that said second net extends from said second frame with a U-shaped cross-sectional shape such that said second net tapers from a first end of said second net which is at said second frame to a rounded second end of said second net spaced away from said second frame, said second body comprising a second body first section, a second body second section, and a second elbow therebetween, said second body first section having an axis which is at an angle relative to an axis of said second body second section at said second elbow, said first and second elongate members pivotally coupled together such that said first and second net assemblies are movable from a closed position wherein said first net assembly is positioned in contact against said second net assembly, to an open position wherein said first net assembly is positioned a distance away from said second net assembly, said first body second section having a first coupling portion and said second body second section having a second coupling portion, said first and second elongate members pivotally coupled at said first and second coupling portions which have substantially planar inner faces that face each other to facilitate the pivotal coupling of the elongate members, and said first and second handle portions each comprising an elliptical loop having a first end attached to a respective second section and terminating at a second free end spaced laterally from the respective second section.

10. A fish net in accordance with claim 9 wherein said first frame is substantially concentrically aligned with said second frame when said fish net is in said closed position.

11. A fish net in accordance with claim 9 wherein said first frame is positioned in mating contact against said second frame when said fish net is in said closed position.

12. A fish net in accordance with claim 9 wherein at least one of said first net and said second net is fabricated from a stretchable material adapted for use in water.

13. A fish net in accordance with claim 9 wherein at least one of said first net assembly and said second net assembly is removably coupled to the respective elongate member.

14. A fish net in accordance with claim 9 wherein said first elongate member is identical to said second elongate member.

* * * * *